G. D. KIRK.
MEAT HOOK.
APPLICATION FILED JULY 8, 1919.
1,333,424.
Patented Mar. 9, 1920.
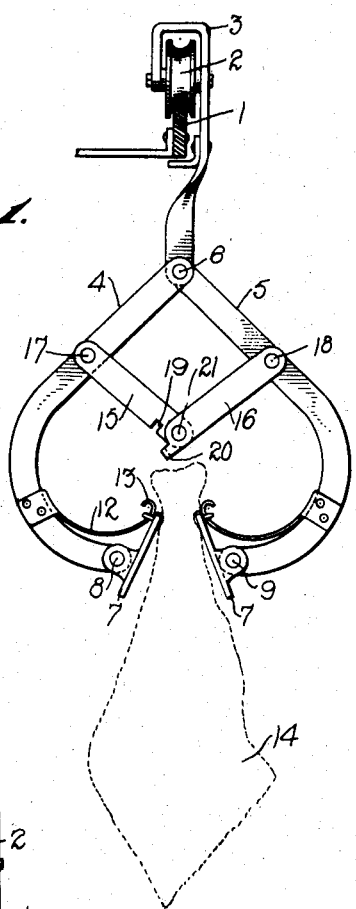
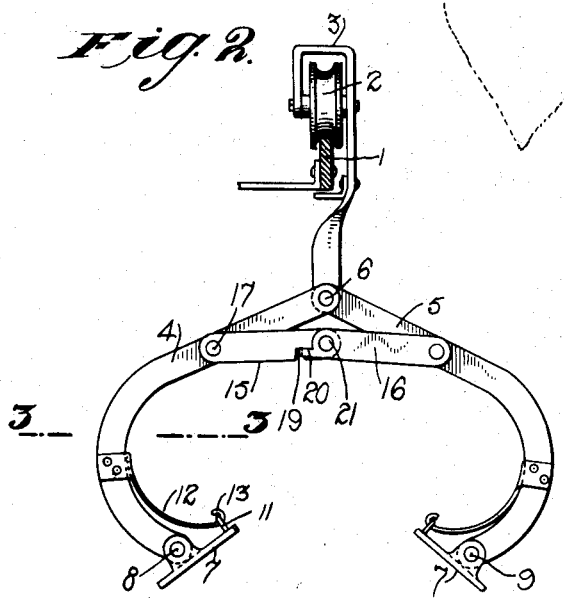
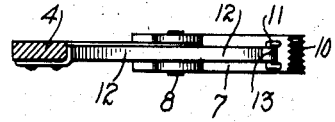
WITNESSES
H. C. Hebig
A. L. Kitchin
INVENTOR
GEORGE DODDS KIRK
BY
ATTORNEYS

UNITED STATES PATENT OFFICE.

GEORGE DODDS KIRK, OF MILFORD, CONNECTICUT.

MEAT-HOOK.

1,333,424.  Specification of Letters Patent.  Patented Mar. 9, 1920.

Application filed July 8, 1919. Serial No. 309,302.

*To all whom it may concern:*

Be it known that I, GEORGE DODDS KIRK, a citizen of the United States, and a resident of Milford, in the county of New Haven and State of Connecticut, have invented a new and Improved Meat-Hook, of which the following is a full, clear, and exact description.

This invention relates to meat supporting devices and particularly to an improved meat hook having for an object the arrangement of the various parts whereby a quick release may be secured at any time.

Another object is to provide a hook wherein an upward movement of the meat will cause a positive releasing action.

A still further object of the invention is to provide a meat supporting hook in which an upward movement of the meat will cause the hook to release the meat and become locked in an open position.

In the accompanying drawing:

Figure 1 is a side view of a hook embodying the invention, the same being shown in operation with a piece of meat supported thereby.

Fig. 2 is a view similar to Fig. 1, but showing the hook in an open position.

Fig. 3 is a fragmentary sectional view through Fig. 2 on line 3—3, the same being on a slightly enlarged scale.

Referring to the accompanying drawing by numerals, 1 indicates a track of any desired construction for receiving the roller 2 carried by the turned over supporting frame 3. The frame 3 has hook arms 4 and 5 pivotally connected therewith at 6, said hook arms being of any size and substantially any shape providing a substantial hook structure. A meat gripping plate 7 is pivotally connected at 8 and 9 to the respective hook arms 4 and 5, said plates if desired, having a roughened or toothed edge 10 at the upper end for engaging the meat, though this is not always necessary. Each plate is also provided with a U-shaped keeper 11 through which the retaining spring 12 passes, said spring having a turned over end 13 whereby the plates cannot drop down beyond a certain point when the hook is opened, as shown in Fig. 2. The end opposite the turned over end 13 is secured by rivets or otherwise rigidly to the respective arms 4 and 5 so as to always hold the plates 7 in proper position, but not interfere with the proper operation thereof.

In use the parts are arranged as shown in Fig. 1 and the plates 7 act as hook members for supporting the meat 14. It will be, of course, seen that the heavier the meat the greater the tendency of the members 7 to enter the meat. However, when removing the meat it is customary for the workman to raise the meat 14 for disengaging the same from the hook members 7. Many times the meat becomes frozen and cannot be readily removed and other times it is difficult of engagement. In the present construction of hook the engagement is easy at all times, but to absolutely insure a quick and ready disengagement of the hook members away from the meat a toggle connection or links 15 and 16 are pivotally mounted at 17 and 18 on arms 4 and 5, link 15 having a notch 19 while link 16 has a projection or ear 20 adapted to fit into notch 19. The links 15 and 16 are pivotally connected at 21 and the notch 19 is of a proper depth for permitting the links to pass dead center as shown in Fig. 2. When the workman lifts the piece of meat 14 he can easily lift the same until the links 15 and 16 are moved to their locked position shown in Fig. 2 whereupon the arms 4 and 5 and associate parts are locked in their open position and the meat may be readily removed without inconvenience. When it is desired to again use the hook the links 15 and 16 are manually moved downwardly to substantially the position shown in Fig. 1 and the meat is then inserted in the usual way.

What I claim is:

1. A meat hook comprising a hanger, a pair of arms pivotally mounted on the hanger, said arms being hook shaped, a pair of flat plates pivotally mounted on said arms, and a flat spring for each of said flat plates for limiting the movement thereof.

2. A meat hook comprising a hanger, a pair of hook arms pivotally mounted on the hanger, a pair of flat plates pivotally mounted on the end of said hook arms, each of said plates being formed with a substantially U-shaped keeper, and a flat spring connected with the respective arms extending through the respective keepers, each of said springs being formed with a hook end for preventing the flat plates from moving beyond a certain distance.

3. In a meat hook the combination of a pair of hook arms pivoted together at one end, means for suspending the arms from said pivoted ends, and a flat plate pivotally mounted on each of the other ends of said arms, said arms being so shaped that the weight of the meat suspended between the plates will hold said hook arms together.

4. In a meat hook the combination of a pair of hook arms pivoted together at one end, means for suspending the arms from said pivoted ends, a flat plate pivotally mounted on each of the other ends of said arms, and a flat spring engaging each of said plates so as to force their upper ends together, said arms being so shaped that the weight of the meat suspended between the plates will hold said hook arms together.

GEORGE DODDS KIRK.